(12) United States Patent
Oh et al.

(10) Patent No.: US 9,317,245 B2
(45) Date of Patent: Apr. 19, 2016

(54) APPARATUS AND METHOD FOR DISPLAYING IMAGES

(71) Applicant: ELECTRONICS AND TELECOMMUNICATIONS RESEARCH INSTITUTE, Daejeon (KR)

(72) Inventors: Sang Yoon Oh, Daejeon (KR); Kwang Yong Lee, Daejeon (KR); Beob Kyun Kim, Daejeon (KR); Seong Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 146 days.

(21) Appl. No.: 14/197,459

(22) Filed: Mar. 5, 2014

(65) Prior Publication Data

US 2014/0306967 A1 Oct. 16, 2014

(30) Foreign Application Priority Data

Apr. 11, 2013 (KR) .................. 10-2013-0040086

(51) Int. Cl.
*G06F 11/00* (2006.01)
*G06F 3/14* (2006.01)

(52) U.S. Cl.
CPC .......... *G06F 3/1454* (2013.01); *G09G 2360/18* (2013.01); *G09G 2370/027* (2013.01); *G09G 2370/04* (2013.01)

(58) Field of Classification Search
CPC .................................................. G06F 3/1454

USPC .......................................... 714/23, 22, 24, 25
See application file for complete search history.

(56) References Cited

U.S. PATENT DOCUMENTS

| 2001/0017630 | A1* | 8/2001 | Sakashita | G06F 3/14 345/635 |
| 2003/0142051 | A1* | 7/2003 | Katsutani | G09G 3/20 345/87 |
| 2006/0007114 | A1* | 1/2006 | Shiraishi | G09G 3/3611 345/103 |
| 2007/0027976 | A1* | 2/2007 | Sasame | H04L 12/1868 709/223 |

FOREIGN PATENT DOCUMENTS

| KR | 10-2005-0118263 A | 12/2005 |
| KR | 10-2009-0066947 A | 6/2009 |

* cited by examiner

*Primary Examiner* — Dieu-Minh Le
(74) *Attorney, Agent, or Firm* — NSIP Law

(57) ABSTRACT

Disclosed herein are an apparatus and method for displaying images. The apparatus includes a first image output unit, a second image output unit, an image signal selection unit, and an image display unit. The first image output unit is set to master operation mode, and outputs an image signal to be displayed. The second image output unit is set to slave operation mode, and, if the first image output unit has failed, is switched to master operation mode and then continuously outputs the image signal or a new image signal. The image signal selection unit compares the IP source address of a received master message with previously stored address information, and then selects the image signal that is received from the first image output unit or the second image output unit that has a matching address. The image display unit displays the selected image signal.

14 Claims, 7 Drawing Sheets

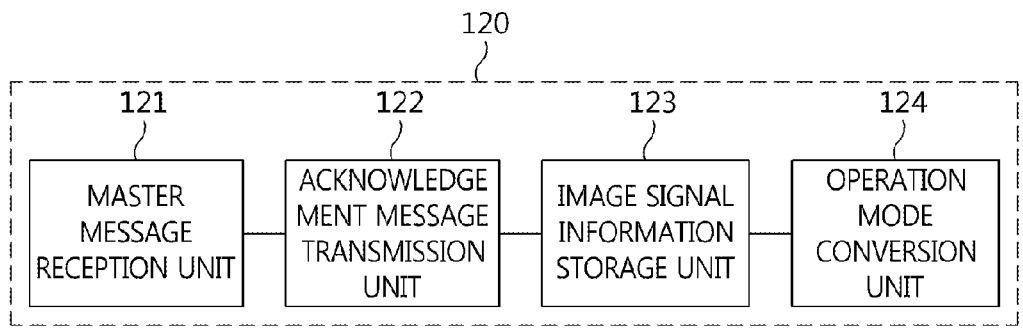
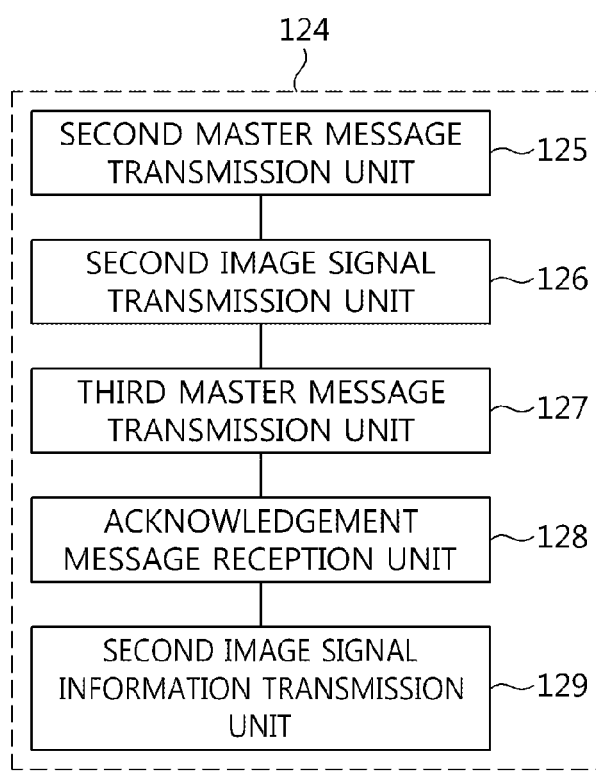

APPARATUS AND METHOD FOR DISPLAYING IMAGES

CROSS REFERENCE TO RELATED APPLICATION

This application claims the benefit of Korean Patent Application No. 10-2013-0040086, filed Apr. 11, 2013, which is hereby incorporated by reference in its entirety into this application.

BACKGROUND OF THE INVENTION

1. Technical Field

The present invention relates generally to an apparatus and method for displaying images and, more particularly, to an apparatus and method for displaying images that are capable of, if an image output unit for outputting images has failed, continuously displaying an image without interruption using another image output unit.

2. Description of the Related Art

A digital video camera configured to include a digital camera, a mobile phone equipped with a camera module, and a digital image processing device, such as a personal digital assistant (PDA), display images on their own display devices, such as a liquid crystal display (LCD).

Meanwhile, if various types of external display devices, such as an LCD TV, a computer monitor, a plasma display panel (PDP), a projection TV, etc., are connected to the above-described digital image processing devices, as disclosed in Korean Patent Application Publication No. 10-2005-0118263, images identical to those displayed on the digital image processing devices can be displayed on the external display devices.

Furthermore, images output from a computer may be displayed on an external display device, such as a large-sized TV, by coupling the images to the external display device, instead of coupling the images to a computer monitor, thereby enabling the display of advertisements.

In this case, a problem arises in that if images are not output because the digital image processing device has failed, the images cannot be displayed on the external display device until the failed digital image processing device is repaired or replaced.

Furthermore, a problem arises in that in order to change an image, the digital image processing device should be stopped and a process of displaying a new image is displayed on the external display device as it is. Accordingly, in order to hide the process of changing an image on the external display device, there is the inconvenience of turning off the power of the external display device, changing the image from the digital image processing device and turning on the power of the external display device.

SUMMARY OF THE INVENTION

Accordingly, the present invention has been made keeping in mind the above problems occurring in the prior art, and an object of the present invention is to provide an apparatus and method for displaying images, in which duplicate image output units are provided, and an image output unit set to slave operation mode is switched to master operation mode if an image output unit set to master operation mode has failed, thereby continuously displaying an output image without interruption.

Another object of the present invention is to provide an apparatus and method for displaying images, in which an image output unit set to slave operation mode stores a new image file and the power of an image output unit set to master operation mode is turned off, thereby enabling an image output unit set to slave operation mode to continuously display a new output image in master operation mode without the interruption of a display image.

In accordance with an aspect of the present invention, there is provided an apparatus for displaying images, including a first image output unit configured to be set to master operation mode, and to output an image signal to be displayed; a second image output unit configured to be set to slave operation mode, and to, if the first image output unit has failed, be switched to master operation mode and then continuously output the image signal or a new image signal; an image signal selection unit configured to compare the IP source address of a master message received from any one of the first image output unit and the second image output unit with previously stored address information and then select the image signal that is received from any one of the first image output unit and the second image output unit that has a matching address; and an image display unit configured to display the selected image signal.

The setting of the first image output unit to master operation mode may correspond to the case where the first image output unit has been booted before the second image output unit or the case where the first image output unit has been booted a first predetermined time after the second image output unit.

The setting of the second image output unit to slave operation mode corresponds to the case where the second image output unit has been booted a first predetermined time before the first image output unit or the case where the second image output unit has been booted after the first image output unit.

If the second image output unit has been booted a time longer than the first predetermined time before the first image output unit, the second image output unit may be set to master operation mode, and the first image output unit may be set to slave operation mode.

The first image output unit may include a first master message transmission unit configured to periodically transmit the master message to the second image output unit and the image signal selection unit; an acknowledgement message reception unit configured to receive a reception acknowledgement message responsive to the master message from the second image output unit; a first image signal transmission unit configured to periodically transmit the image signal to the image signal selection unit; and a first image signal information transmission unit configured to periodically transmit information about the image signal to the second image output unit.

The information about the image signal may include at least one of information about the file name of an image being currently output and information about a time between a start image and the image being currently output.

The second image output unit may include a master message reception unit configured to periodically receive the master message from the first image output unit; an acknowledgement message transmission unit configured to transmit a reception acknowledgement message responsive to the master message to the first image output unit; an image signal information storage unit configured to periodically receive the information about the image signal from the first image output unit, to determine whether there is an image file whose name is identical to the name of the image being currently output, and to, if there is no stored image file, discard the received information about the image signal, and, if there is a stored image file, make an update with the received information about the image signal and then store the received information about the image signal; and an operation mode conversion unit configured to, if the master message or the information about the image signal has not been received from the first image output unit for a time equal to or longer than a predetermined time, determine that the first image output unit has failed, and switch operation mode of the second image output unit to master operation mode.

The operation mode conversion unit may include a second master message transmission unit configured to periodically transmit the master message to the image signal selection unit; a second image signal transmission unit configured to, if there is no updated and stored information about the image signal in the image signal information storage unit, output an image signal based on an image file previously stored at initialization and transmit the image signal to the image signal selection unit, and, if there is the updated and stored information about the image signal in the image signal information storage unit, output an image signal subsequent to the image signal and transmit the subsequent image signal to the image signal selection unit; a third master message transmission unit configured to, if the first image output unit has recovered from a failure, determine that the first image output unit has recovered from a failure, and periodically transmit a master message to the first image output unit; an acknowledgement message reception unit configured to receive a reception acknowledgement message responsive to the master message from the first image output unit; and a second image signal information transmission unit configured to periodically transmit the information about the image signal to the first image output unit.

The previously stored address information may be the Internet Protocol (IP) addresses of the first image output unit and the second image output unit stored at initialization.

The apparatus may further include a monitoring unit configured to receive the master message or a reception acknowledgement message responsive to the master message from the first image output unit, the second image output unit and the image signal selection unit, and to monitor the operating status of the first image output unit and the second image output unit and the operating status of the image signal selection unit.

The apparatus may further include a switching unit configured to switch the master message or a reception acknowledgement message responsive to the master message received from the first image output unit or the second image output unit to a destination address.

In accordance with an aspect of the present invention, there is provided a method of displaying images, including outputting, by a first image output unit set to master operation mode, an image signal to be displayed; if the first image output unit has failed, switching a second image output unit set to slave operation mode to master operation mode, and continuously outputting, by the second image output unit configured to be set to slave operation mode, the image signal or a new image signal; comparing, by an image signal selection unit, the IP source address of a master message received from any one of the first image output unit and the second image output unit with previously stored address information; selecting, by the image signal selection unit, the image signal that is received from any one of the first image output unit and the second image output unit that has a matching address; and displaying, by an image display unit, the selected image signal.

Outputting the image signal to be displayed may include periodically transmitting the master message to the second image output unit and the image signal selection unit; continuously transmitting the image signal to the image signal selection unit; and periodically transmitting the information about the image signal to the second image output unit.

Switching the second image output unit to master operation mode and continuously outputting the image signal or the new image signal may include periodically receiving the master message from the first image output unit; transmitting a reception acknowledgement message responsive to the master message to the first image output unit; periodically receiving the information about the image signal from the first image output unit, determining whether there is an image file whose name is identical to the name of the image being currently output, and, if there is no stored image file, discarding the received information about the image signal, and, if there is a stored image file, storing the received information about the image signal; and if the master message or the information about the image signal has not been received from the first image output unit for a time equal to or longer than a predetermined time, determining that the first image output unit has failed, and switching operation mode of the second image output unit to master operation mode.

Switching the operation mode of the second image output unit to master operation mode may include periodically transmitting the master message to the image signal selection unit; if there is no updated and stored information about the image signal in the image signal information storage unit, outputting an image signal based on an image file previously stored at initialization and transmitting the image signal to the image signal selection unit, and, if there is the updated and stored information about the image signal in the image signal information storage unit, outputting an image signal subsequent to the image signal and transmitting the subsequent image signal to the image signal selection unit; if the first image output unit has recovered from a failure, periodically transmitting a master message to the first image output unit; receiving a reception acknowledgement message responsive to the master message from the first image output unit; and periodically transmitting the information about the image signal to the first image output unit.

Comparing the IP source address of the master message received from any one of the first image output unit and the second image output unit with the previously stored address information may include comparing the IP source address of the master message with IP addresses of the first image output unit and the second image output unit stored at initialization.

BRIEF DESCRIPTION OF THE DRAWINGS

The above and other objects, features and advantages of the present invention will be more clearly understood from the following detailed description taken in conjunction with the accompanying drawings, in which:

FIG. 3 is a diagram illustrating the detailed configuration of a second image output unit used in the apparatus for displaying images according to the embodiment of the present invention;

FIG. 4 is a diagram illustrating the detailed configuration of an operation mode conversion unit used in the second image output unit according to the embodiment of the present invention;

DESCRIPTION OF THE PREFERRED EMBODIMENTS

Figure 1:
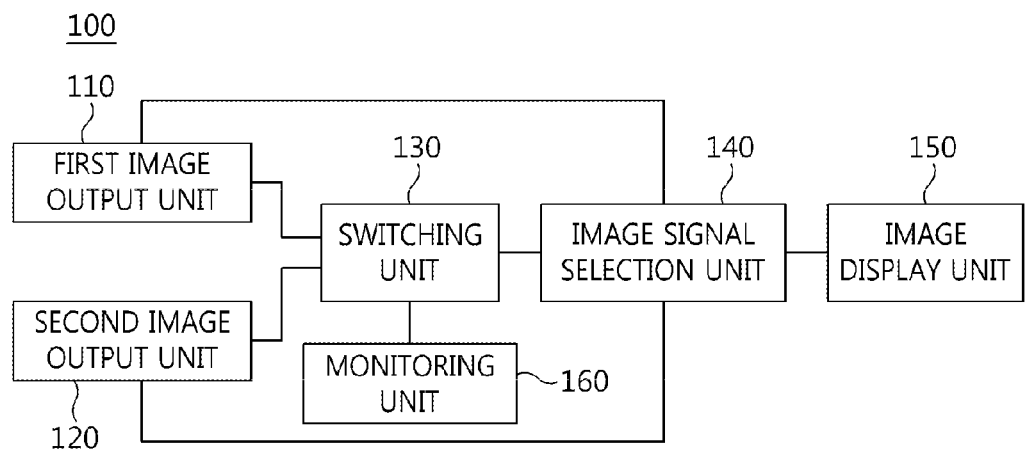
FIG. 1 is a diagram illustrating the configuration of an apparatus for displaying images according to an embodiment of the present invention.

In order to describe the present invention in detail so that those having ordinary knowledge in the technical field to which the present invention pertains can readily practice the technical spirit of the present invention, preferred embodiments of the present invention will be described below with reference to the accompanying drawings. It should be noted that the same reference numerals are used throughout the different drawings to designate the same or similar components. Furthermore, in the following description, when it is determined that detailed descriptions of well-known functions related to the present invention and configurations thereof would make the gist of the present invention obscure, they will be omitted.

An apparatus and method for displaying images according to embodiments of the present invention will be described in detail below.

Figure 2:
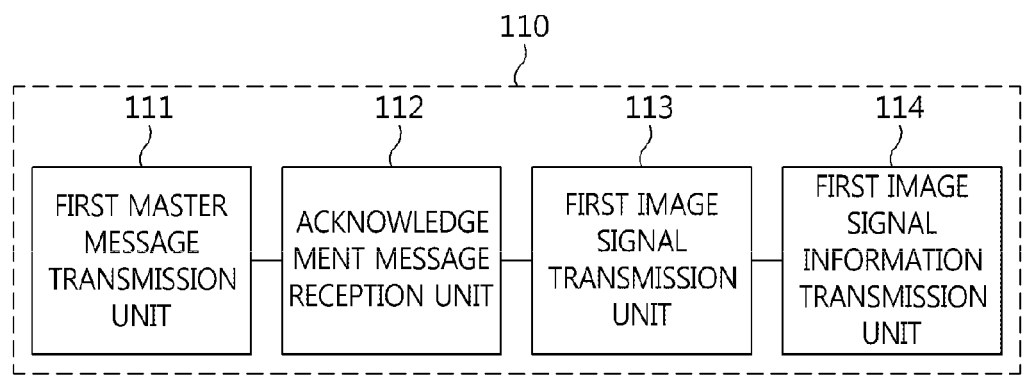
FIG. 2 is a diagram illustrating the detailed configuration of a first image output unit used in the apparatus for displaying images according to the embodiment of the present invention.

FIG. 1 is a diagram illustrating the configuration of an apparatus 100 for displaying images according to an embodiment of the present invention, FIG. 2 is a diagram illustrating the detailed configuration of a first image output unit used in the apparatus 100 for displaying images according to the embodiment of the present invention, FIG. 3 is a diagram illustrating the detailed configuration of a second image output unit used in the apparatus 100 for displaying images according to the embodiment of the present invention, and FIG. 4 is a diagram illustrating the detailed configuration of an operation mode conversion unit used in the second image output unit according to the embodiment of the present invention.

Referring to FIG. 1, the apparatus 100 for displaying images according to the embodiment of the present invention includes a first image output unit 110, a second image output unit 120, a switching unit 130, an image signal selection unit 140, a monitoring unit 160, and an image display unit 150. In this case, the first image output unit 110 and the second image output unit 120 may be computers that output images.

The first image output unit 110 is set such that the operation mode thereof is set to master operation mode, and outputs an image signal related to an image to be displayed. In this case, the setting of the operation mode of the first image output unit 110 to master operation mode corresponds to the case where the first image output unit 110 has been booted a first predetermined time after the second image output unit 120. The setting to master operation mode will be described in detail later with reference to FIGS. 5 and 6.

The first image output unit 110 includes a first master message transmission unit 111, an acknowledgement message reception unit 112, a first image signal transmission unit 113, and a first image signal information transmission unit 114, as illustrated in FIG. 2.

The first master message transmission unit 111 periodically transmits a master message to the second image output unit 120, the image signal selection unit 140, and the monitoring unit 160.

The acknowledgement message reception unit 112 receives a reception acknowledgement message responsive to a master message from the second image output unit 120.

The first image signal transmission unit 113 periodically transmits an image signal to the image signal selection unit 140.

The first image signal information transmission unit 114 periodically transmits information about an image signal to the second image output unit 120. In this case, the information about the image signal may include at least one of information about the file name of an image being currently output and information about a time between a start image and the image being currently output.

The second image output unit 120 is set such that the operation mode thereof is set to slave operation mode. In this case, the setting of the second image output unit 120 to slave operation mode corresponds to the case where the second image output unit 120 has been booted the first predetermined time before the first image output unit 110 or the case where the second image output unit 120 has been booted after the first image output unit 110. The setting to slave operation mode will be described in detail later with reference to FIGS. 5 and 6. Meanwhile, when the second image output unit 120 has been booted a time equal to or longer than the first predetermined time before the first image output unit 110, the operation mode of the second image output unit 120 may be set to master operation mode and the operation mode of the first image output unit 110 may be set to slave operation mode.

If the first image output unit 110 has failed, the second image output unit 120 is switched to master operation mode and continuously outputs an image signal. In this case, the case where the first image output unit 110 fails may correspond to the case where the image output unit fails because of an error in a computer program or an operating system (OS) or the case where rebooting is performed because of the error.

The second image output unit 120 includes a master message reception unit 121, an acknowledgement message transmission unit 122, an image signal information storage unit 123, and an operation mode conversion unit 124, as illustrated in FIG. 3.

The master message reception unit 121 periodically receives a master message from the first image output unit 110.

The acknowledgement message transmission unit 122 transmits a reception acknowledgement message responsive to a master message to the first image output unit 110, from which the master message has been received.

The image signal information storage unit 123 periodically receives information about the image signal information from the first image output unit 110, and stores the information. The image signal information storage unit 123 basically stores the same image file as the first image output unit 110 at the initiation of a system, periodically receives information about an image signal from the first image output unit 110, determines whether there is an image file whose name is identical to the name of the image being currently output, and discards the received information about the image signal if there is not an image file that has been stored, and updates and stores the received information about the image signal if there is an image file that has been stored. In this case, the information about the image signal may include at least one of information about the file name of an image being currently output and information about a time between a start image and the image being currently output.

If a master message or an image signal have not been received from the first image output unit 110 for a time equal to or longer than a predetermined time, the operation mode conversion unit 124 determines that the first image output unit 110 has failed, and switches the operation mode of the second image output unit 120 to master operation mode. For this purpose, the operation mode conversion unit 124 includes a second master message transmission unit 125, a second image signal transmission unit 126, a third master message transmission unit 127, an acknowledgement message reception unit 128, and a second image signal information transmission unit 129, as illustrated in FIG. 4.

The second master message transmission unit 125 periodically transmits a master message to the image signal selection unit 140 and the monitoring unit 160.

If there is no updated and stored information about an image signal in the image signal information storage unit 123, the second image signal transmission unit 126 outputs an image signal based on the image file previously stored at the initiation, and transmits the output image signal to the image signal selection unit 140. In contrast, if there is updated and stored information about an image signal in the image signal information storage unit 123, the second image signal transmission unit 126 outputs a subsequent image signal and transmits the output subsequent image signal to the image signal selection unit 140.

If the first image output unit 110 has recovered from a failure, the third master message transmission unit 127 determines that the first image output unit 110 has recovered from a failure, and periodically transmits a master message to the first image output unit 110.

The acknowledgement message reception unit 128 receives a reception acknowledgement message responsive to the master message from the first image output unit 110.

The second image signal information transmission unit 129 periodically transmits information about an image signal to the first image output unit 110.

The switching unit 130 switches a master message or a reception acknowledgement message responsive to a master message transmitted from the first image output unit 110 or the second image output unit 120 to a destination address. In this case, the switching unit 130 may be implemented as a Layer 3 (L3) switch. The L3 switch is a device that performs routing or switching while referring to the destination information of an Internet Protocol (IP) packet. The L3 switch may reduce the numbers of connection lines and ports, and may send an IP packet to every device connected via a single line.

The image signal selection unit 140 compares the IP source address of a master message received from any one of the first image output unit 110 and the second image output unit 120 with previously stored address information, selects an image signal that has been received from any one of the first image output unit 110 and the second image output unit 120 that has a matching address, and transmits the selected image signal to the image display unit 150. In this case, the previously stored address information is the IP addresses of the first image output unit 110 and the second image output unit 120 stored at the initiation. For example, if a matching result obtained by comparing the IP source address of a master message received from the first image output unit 110 or the second image output unit 120 with the previously stored address information corresponds to a master message received from the first image output unit 110, the image signal selection unit 140 may select an image signal received from the first image output unit 110. In contrast, if the matching result corresponds to a master message received from the second image output unit 120, the image signal selection unit 140 may select an image signal received from the second image output unit 120.

The image display unit 150 displays the selected image signal on a display means.

The monitoring unit 160 may receive master messages or reception acknowledgement messages from the first image output unit 110, the second image output unit 120 and the image signal selection unit 140, and may monitor the operating status of the first image output unit 110 and the second image output unit 120 and the operating status of the image signal selection unit 140, thereby being able to easily determine whether the image output unit has failed and thus facilitate maintenance and repair.

In the apparatus 100 for displaying images configured as described above, when the first image output unit 110 powered first at the initiation of the system operates in master operation mode, an image signal output from the first image output unit 110 is displayed on the image display unit 150 by way of the switching unit 130 and the image signal selection unit 140. If the first image output unit 110 fails while the second image output unit 120 is operating in slave operation mode, the second image output unit 120 is switched to master operation mode, outputs an image signal, and allows the output image signal to be displayed on the image display unit 150 by way of the switching unit 130 and the image signal selection unit 140, thereby enabling continuous image display.

Meanwhile if the first image output unit 110 and the second image output unit 120 are simultaneously powered at the initiation of the system, the first image output unit 110 previously set to master operation mode operates in master operation mode. If the first image output unit 110 fails while the second image output unit 120 is operating in slave operation mode, the second image output unit 120 is switched to master operation mode, and then operates, thereby enabling continuous image display.

Figure 5:
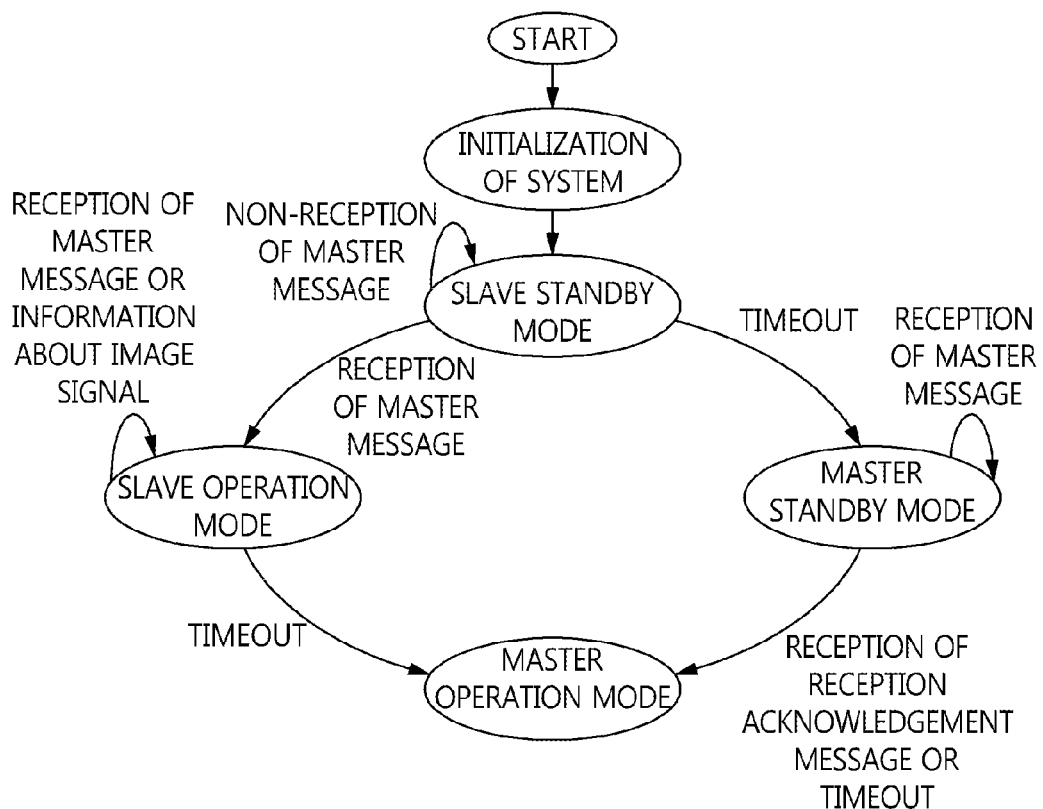
FIG. 5 is a state diagram illustrating a process of switching the operation mode of a first image output unit according to an embodiment of the present invention.

FIG. 5 is a state diagram illustrating a process of switching the operation mode of the first image output unit 110 according to an embodiment of the present invention.

Referring to FIG. 5, the first image output unit 110 operates in the slave standby mode of waiting for the reception of a master message from the second image output unit 120 for a predetermined time at the initiation of the system. If a master message has not been received from the second image output unit 120 within a predetermined time (a timeout period) after power has been applied, the first image output unit 110 operates in master standby mode, and transmits a master message to the second image output unit 120. This case may correspond to the case where the first image output unit 110 and the second image output unit 120 simultaneously have started the transmission of a master message. Thereafter, if a reception acknowledgement message responsive to the master message is received from the second image output unit 120, the first image output unit 110 operates in master operation mode.

Figure 6:
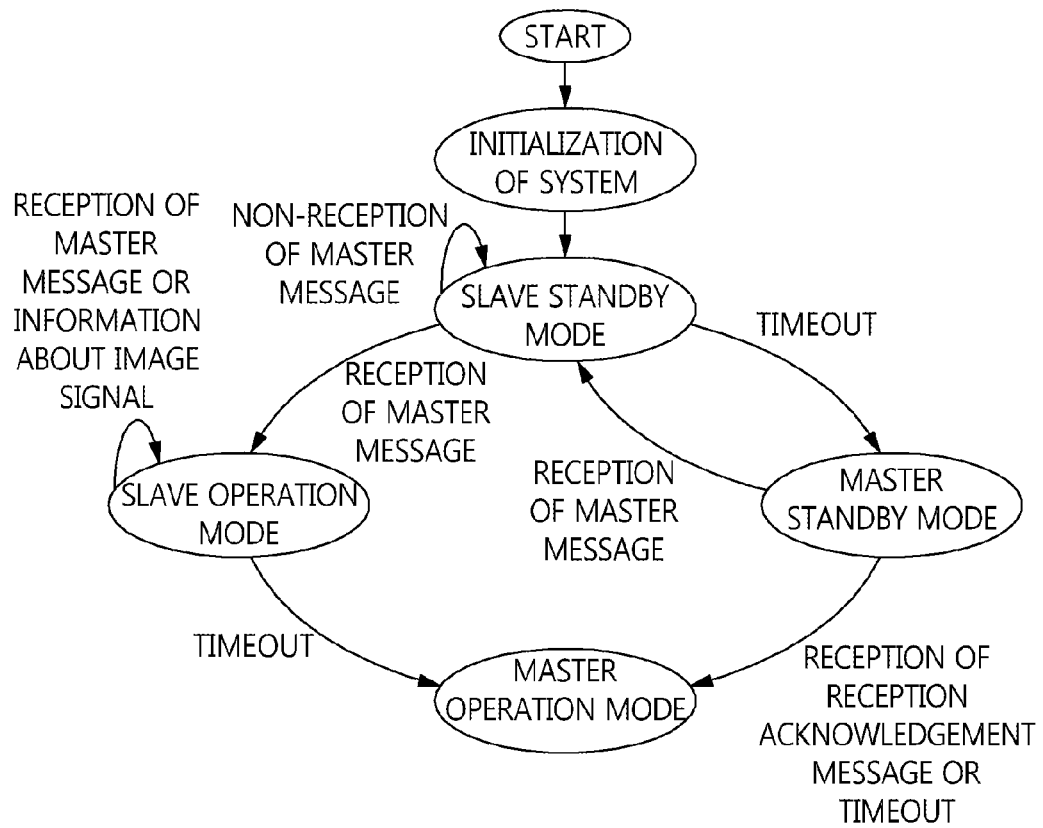
FIG. 6 is a state diagram illustrating a process of switching the operation mode of a second image output unit according to an embodiment of the present invention.

FIG. 6 is a state diagram illustrating a process of switching the operation mode of the second image output unit 120 according to an embodiment of the present invention.

Referring to FIG. 6, the second image output unit 120 operates in the slave standby mode of waiting for the reception of a master message from the first image output unit 110 for a predetermined time at the initiation of the system. If a master message has not been received from the first image output unit 110 within a predetermined time after power has been applied, the second image output unit 120 operates in master standby mode. Thereafter, if a master message has not been received or an acknowledgment message has been received from the first image output unit 110, the second image output unit 120 operates in master operation mode. This case may correspond to the case where a single image output unit operates because of the failure of the first image output unit 110 or the turning off of power or the case where the first image output unit 110 starts at the first predetermined time later than the second image output unit 120.

Meanwhile, if a master message is received from the first image output unit 110 within the first predetermined time after power has been applied, the second image output unit 120 operates in slave operation mode. Thereafter, if a master message or information about an image signal has not been received from the first image output unit 110 for a time equal to or longer than a predetermined time, the second image output unit 120 may be switched to master operation mode.

In greater detail, if the first image output unit 110 and the second image output unit 120 started at almost the same time, the first image output unit 110 and the second image output unit 120 wait in slave standby mode in the same manner. Before the first image output unit 110 receives a reception acknowledgement message after transmitting a master message, the first image output unit 110 and the second image output unit 120 compete in master operation mode.

In this case, the determination of the master or slave operation mode is performed as follows. If the first image output unit 110 has transmitted a master message to the second image output unit 120 before receiving a reception acknowledgement message from the second image output unit 120, the first image output unit 110 transmits a master message to the second image output unit 120 again. Thereafter, the first image output unit 110 that has received a reception acknowledgement message from the second image output unit 120 after a predetermined time has elapsed operates in master operation mode, and periodically transmits a master message and an image signal to the second image output unit 120, the monitoring unit 160 and the image signal selection unit 140.

Then the second image output unit 120 waits for a master message from the first image output unit 110 in slave standby mode for a predetermined time. The second image output unit 120 receives a master message, transmits a reception acknowledgement message responsive to the master message to the first image output unit 110, and then operates in slave operation mode. In this case, the second image output unit 120 periodically transmits a reception acknowledgement message to the monitoring unit 160.

Meanwhile, if only the second image output unit 120 operates because the first image output unit 110 has failed, the second image output unit 120 waits for a master message from the first image output unit 110 in slave operation mode state for a predetermined time. The second image output unit 120 that has not received a master message is switched to master operation mode, and then continuously outputs an image signal that was output by the first image output unit 110 or outputs a new image signal. Thereafter, if the first image output unit 110 has been repaired or replaced, booted and put into communication, a master message and information about an image signal are transmitted to the first image output unit 110.

Figure 7:
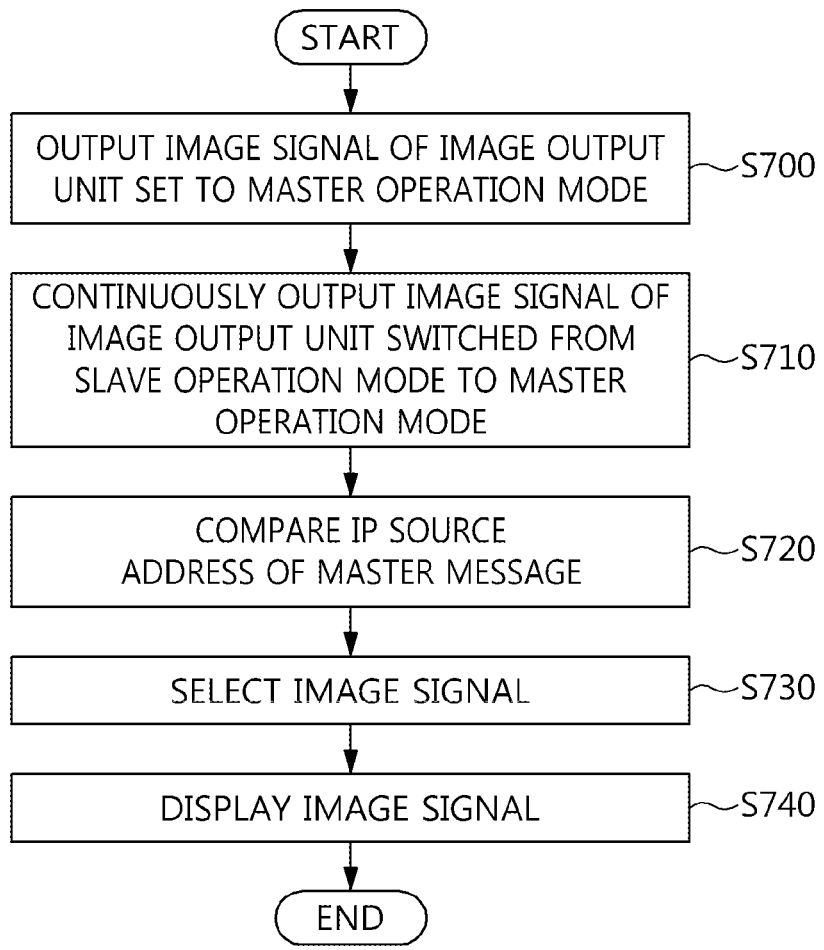
FIG. 7 is a flowchart illustrating a method of displaying images according to an embodiment of the present invention.

FIG. 7 is a flowchart illustrating a method of displaying images according to an embodiment of the present invention.

Referring to FIG. 7, the method of displaying images according to this embodiment of the present invention uses the apparatus for displaying images. Redundant descriptions will be omitted.

First, at step S700, an image signal to be displayed is output by the first image output unit 110 set to master operation mode.

Thereafter, if the first image output unit 110 has failed, the second image output unit 120 set to slave operation mode is switched to master operation mode and then continuously outputs an image signal at step S710.

Thereafter, the image signal selection unit 140 compares the IP source address of a master message received from any one of the first image output unit 110 and the second image output unit 120 with previously stored address information at step S720. That is, the image signal selection unit 140 compares the IP source address of a master message received from the first image output unit 110 or the second image output unit 120 with the IP addresses of the first image output unit 110 and the second image output unit 120 stored at initiation.

Thereafter, the image signal selection unit 140 selects an image signal that has been received from any one of the first image output unit 110 and the second image output unit 120 that has a matching address at step S730. That is, the image signal selection unit 140 may select an image signal received from the first image output unit 110 if a comparison and matching result corresponds to a master message received from the first image output unit 110, and may select an image signal received from the second image output unit 120 if the comparison and matching result corresponds to a master message received from the second image output unit 120. In this case, the case where the master message has been received from the second image output unit 120 corresponds to the case where the first image output unit 110 has failed and the operation mode of the second image output unit 120 has been switched to master operation mode.

Finally, the image display unit 150 displays the selected image signal at step S740.

Figure 8:
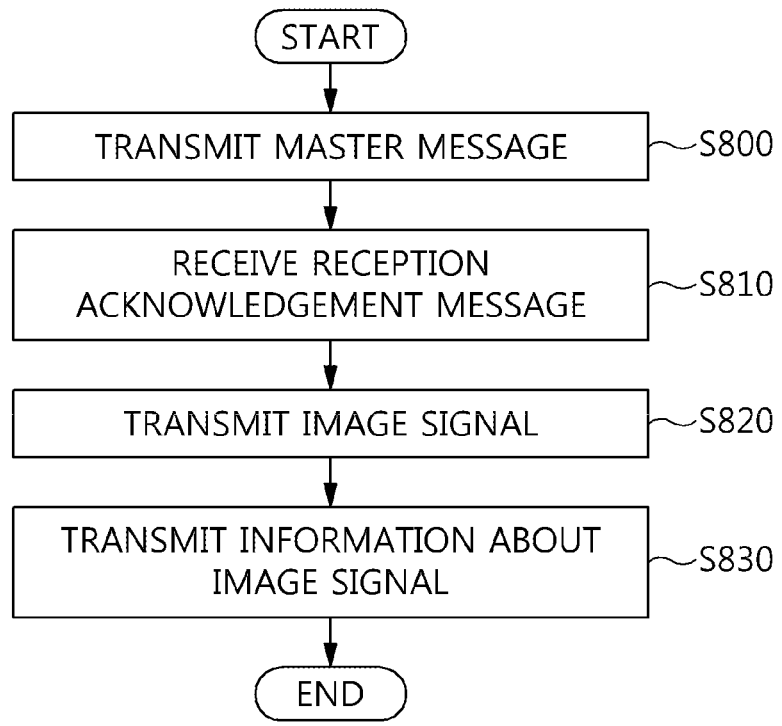
FIG. 8 is a flowchart illustrating the operation of the first image output unit in the method of displaying images according to the embodiment of the present invention.

FIG. 8 is a flowchart illustrating the operation of the first image output unit in the method of displaying images according to the embodiment of the present invention.

Referring to FIG. 8, first, the first image output unit 110 periodically transmits a master message to the second image output unit 120 and the image signal selection unit 140 at step S800. Thereafter, a reception acknowledgement message responsive to the master message is received from the second image output unit 120 at step S810. Thereafter, an image signal is periodically transmitted to the image signal selection unit 140 at step S820, and information about the image signal is periodically transmitted to the second image output unit 120 at step S830

Figure 9:
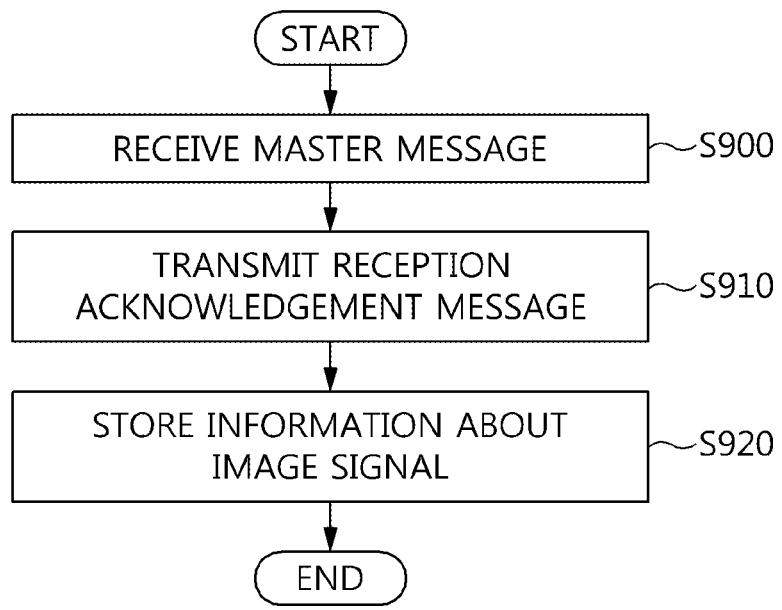
FIG. 9 is a flowchart illustrating the operation of the second image output unit in the method of displaying images according to the embodiment of the present invention.
Figure 10:
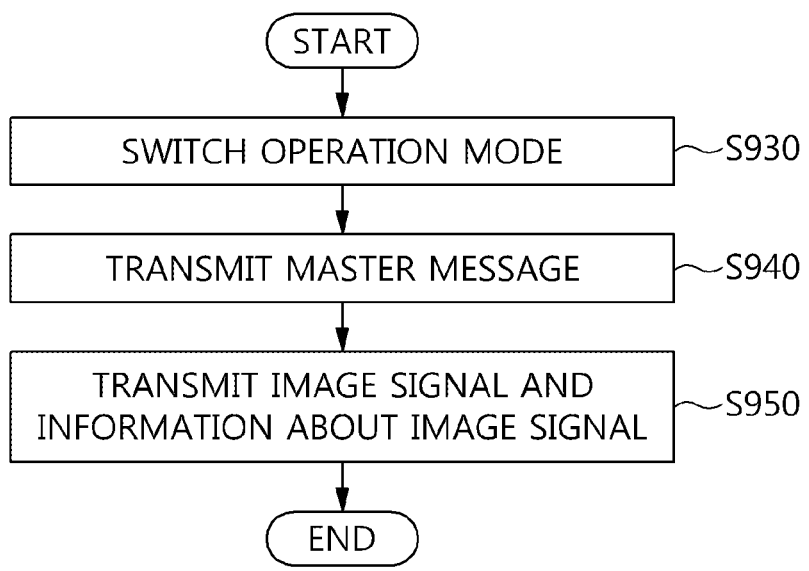
FIG. 10 is a flowchart illustrating a process of switching the operation mode of the second image output unit according to the embodiment of the present invention.

FIG. 9 is a flowchart illustrating the operation of the second image output unit in the method of displaying images according to the embodiment of the present invention, and FIG. 10 is a flowchart illustrating a method of switching the operation mode of the second image output unit according to the embodiment of the present invention.

Referring to FIG. 9, first, the second image output unit 120 set to slave operation mode periodically receives a master message from the first image output unit 110 at step S900.

Thereafter, the second image output unit 120 transmits a reception acknowledgement message responsive to the master message to the first image output unit 110 at step S910. Thereafter, the second image output unit 120 periodically receives information about an image signal from the first image output unit 110 and stores the information at step S920. At step S920, the second image output unit 120 determines whether there is the same image file stored at initialization as in the first image output unit 110, and, if the image file has not been stored, discards the received information about the image signal and, if the image file has been stored, performs updating using the received information about the image signal and then stores the results of the updating.

In this case, if a master message or information about an image signal has not been received from the first image output unit 110 for a time equal to or longer than a predetermined time, it is determined that the first image output unit 110 has failed, and first, the operation mode of the second image output unit 120 is switched to master operation mode first at step S930, as illustrated in FIG. 10. Thereafter, the second image output unit 120 periodically transmits a master message to the image signal selection unit 140 at step S940. Thereafter, at step S950, if there is not the same image file that is stored in the first image output unit 110, an image signal is output based on the image file stored at initialization and transmitted to the image signal selection unit 140. Furthermore, at step S950, if there is the same image file that is stored in the first image output unit 110, subsequent image signal is output and then transmitted to the image signal selection unit 140 at step S950. Thereafter, if the first image output unit 110 has recovered from a failure, it is determined that the first image output unit 110 has recovered from a failure, a master message is periodically transmitted to the first image output unit 110, a reception acknowledgement message responsive to the master message is received from the first image output unit 110, and information about the image signal is periodically transmitted to the first image output unit 110.

As described above, in the apparatus and method for displaying images according to the present invention, if the first image output unit 110 set to master operation mode has failed, the second image output unit 120 set to the slave operation mode is switched to master operation mode, thereby continuously displaying an output image without interruption.

Furthermore, in accordance with the present invention, the second image output unit 120 set to slave operation mode periodically receives information about an image signal including information about the file name of an image or information about a time between a start image and the image being currently output from the first image output unit 110 set to master operation mode and then stores the information, thereby continuously displaying an output image without interruption even when a failure is dealt with or even when an image file or a program is changed.

Furthermore, the present invention may further include the monitoring unit 160 configured to monitor the master or slave operation mode status of the first image output unit 110 and the second image output unit 120, and thus it can be easily determined whether the image output units have failed, thereby maximizing the operation efficiency of the apparatus for displaying images.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for displaying images, comprising:
    a first image output unit configured to be set to master operation mode, and to output an image signal to be displayed,
    wherein the first image output unit comprises:
        a first master message transmission unit configured to periodically transmit the master message to the second image output unit and the image signal selection unit;
        an acknowledgement message reception unit configured to receive a reception acknowledgement message responsive to the master message from the second image output unit;
        a first image signal transmission unit configured to periodically transmit the image signal to the image signal selection unit; and
        a first image signal information transmission unit configured to periodically transmit information about the image signal to the second image output unit;
    a second image output unit configured to be set to slave operation mode first, and to, if the first image output unit has failed, be switched to master operation mode and then continuously output the image signal or a new image signal;
    an image signal selection unit configured to compare an IP source address of a master message received from any one of the first image output unit and the second image output unit with previously stored address information and then select the image signal that is received from any one of the first image output unit and the second image output unit that has a matching address; and
    an image display unit configured to display the selected image signal.

2. The apparatus of claim 1, wherein the setting of the first image output unit to master operation mode corresponds to a case where the first image output unit has been booted before the second image output unit or a case where the first image output unit has been booted a first predetermined time after the second image output unit.

3. The apparatus of claim 1, wherein the setting of the second image output unit to slave operation mode corresponds to a case where the second image output unit has been booted a first predetermined time before the first image output unit or a case where the second image output unit has been booted after the first image output unit.

4. The apparatus of claim 1, wherein if the second image output unit has been booted a time longer than the first predetermined time before the first image output unit, the second image output unit is set to master operation mode, and the first image output unit is set to slave operation mode.

5. The apparatus of claim 1, wherein the information about the image signal comprises at least one of information about a file name of an image being currently output and information about a time between a start image and the image being currently output.

6. The apparatus of claim 1, wherein the second image output unit comprises:
    a master message reception unit configured to periodically receive the master message from the first image output unit;
    an acknowledgement message transmission unit configured to transmit a reception acknowledgement message responsive to the master message to the first image output unit;
    an image signal information storage unit configured to periodically receive the information about the image signal from the first image output unit, to determine whether there is an image file whose name is identical to the name of the image being currently output, and to, if there is no stored image file, discard the received information about the image signal, and, if there is a stored image file, make an update with the received information about the image signal and then store results of the update; and an operation mode conversion unit configured to, if the master message or the information about the image signal has not been received from the first image output unit for a time equal to or longer than a predetermined time, determine that the first image output unit has failed, and switch operation mode of the second image output unit to master operation mode.

7. The apparatus of claim 6, wherein the operation mode conversion unit comprises:
   a second master message transmission unit configured to periodically transmit the master message to the image signal selection unit;
   a second image signal transmission unit configured to, if there is no updated and stored information about the image signal in the image signal information storage unit, output an image signal based on an image file previously stored at initialization and transmit the image signal to the image signal selection unit, and, if there is the updated and stored information about the image signal in the image signal information storage unit, output an image signal subsequent to the image signal and transmit the subsequent image signal to the image signal selection unit;
   a third master message transmission unit configured to, if the first image output unit has recovered from a failure, determine that the first image output unit has recovered from a failure, and periodically transmit a master message to the first image output unit;
   an acknowledgement message reception unit configured to receive a reception acknowledgement message responsive to the master message from the first image output unit; and
   a second image signal information transmission unit configured to periodically transmit the information about the image signal to the first image output unit.

8. The apparatus of claim 1, wherein the previously stored address information is Internet Protocol (IP) addresses of the first image output unit and the second image output unit stored at initialization.

9. The apparatus of claim 1, further comprising a monitoring unit configured to receive the master message or a reception acknowledgement message responsive to the master message from the first image output unit, the second image output unit and the image signal selection unit, and to monitor operating status of the first image output unit and the second image output unit and operating status of the image signal selection unit.

10. The apparatus of claim 1, further comprising a switching unit configured to switch the master message or a reception acknowledgement message responsive to the master message received from the first image output unit or the second image output unit to a destination address.

11. A method of displaying images, comprising:
   outputting, by a first image output unit set to master operation mode, an image signal to be displayed;
   if the first image output unit has failed, switching a second image output unit set to slave operation mode to master operation mode, and continuously outputting, by the second image output unit configured to be set to slave operation mode, the image signal or a new image signal;
   comparing, by an image signal selection unit, an IP source address of a master message received from any one of the first image output unit and the second image output unit with previously stored address information;
   selecting, by the image signal selection unit, the image signal that is received from any one of the first image output unit and the second image output unit that has a matching address; and
   displaying, by an image display unit, the selected image signal,
   wherein switching the second image output unit to master operation mode and continuously outputting the image signal or the new image signal comprises:
      periodically receiving the master message from the first image output unit;
      transmitting a reception acknowledgement message responsive to the master message to the first image output unit;
      periodically receiving the information about the image signal from the first image output unit, determining whether there is an image file whose name is identical to the name of the image being currently output, and, if there is no stored image file, discarding the received information about the image signal, and, if there is a stored image file, storing the received information about the image signal; and
      if the master message or the information about the image signal has not been received from the first image output unit for a time equal to or longer than a predetermined time, determining that the first image output unit has failed, and switching operation mode of the second image output unit to master operation mode.

12. The method of claim 11, wherein outputting the image signal to be displayed comprises:
   periodically transmitting the master message to the second image output unit and the image signal selection unit;
   continuously transmitting the image signal to the image signal selection unit; and
   periodically transmitting the information about the image signal to the second image output unit.

13. The method of claim 11, wherein switching the operation mode of the second image output unit to master operation mode comprises:
   periodically transmitting the master message to the image signal selection unit;
   if there is no updated and stored information about the image signal in the image signal information storage unit, outputting an image signal based on an image file previously stored at initialization and transmitting the image signal to the image signal selection unit, and, if there is the updated and stored information about the image signal in the image signal information storage unit, outputting an image signal subsequent to the image signal and transmitting the subsequent image signal to the image signal selection unit;
   if the first image output unit has recovered from a failure, periodically transmitting a master message to the first image output unit;
   receiving a reception acknowledgement message responsive to the master message from the first image output unit; and
   periodically transmitting the information about the image signal to the first image output unit.

14. The method of claim 11, wherein comparing the IP source address of the master message received from any one of the first image output unit and the second image output unit with the previously stored address information comprises comparing the IP source address of the master message with IP addresses of the first image output unit and the second image output unit stored at initialization.

\* \* \* \* \*